No. 739,329. PATENTED SEPT. 22, 1903.
J. H. LUBBERS.
METHOD OF DRAWING GLASS ARTICLES.
APPLICATION FILED SEPT. 13, 1902.
NO MODEL. 4 SHEETS—SHEET 3.

WITNESSES

INVENTOR
John H. Lubbers
by Bakewell & Byrnes
his Attorneys.

No. 739,329. PATENTED SEPT. 22, 1903.
J. H. LUBBERS.
METHOD OF DRAWING GLASS ARTICLES.
APPLICATION FILED SEPT. 13, 1902.
NO MODEL. 4 SHEETS—SHEET 4.

WITNESSES

INVENTOR

No. 739,329. Patented September 22, 1903.

UNITED STATES PATENT OFFICE.

JOHN H. LUBBERS, OF ALLEGHENY, PENNSYLVANIA, ASSIGNOR TO JAMES A. CHAMBERS, TRUSTEE, OF ALLEGHENY, PENNSYLVANIA.

METHOD OF DRAWING GLASS ARTICLES.

SPECIFICATION forming part of Letters Patent No. 739,329, dated September 22, 1903.

Application filed September 13, 1902. Serial No. 123,223. (No model.)

*To all whom it may concern:*

Be it known that I, JOHN H. LUBBERS, of Allegheny, Allegheny county, Pennsylvania, have invented a new and useful Method of Drawing Glass Articles, of which the following is a full, clear, and exact description, reference being had to the accompanying drawings, forming part of this specification.

My invention relates to a method of drawing glass articles, especially hollow glass cylinders or other hollow glass articles described and claimed in the Letters Patent heretofore granted to me on June 10, 1902, and is illustrated in the accompanying drawings, in which—

Figure 1:
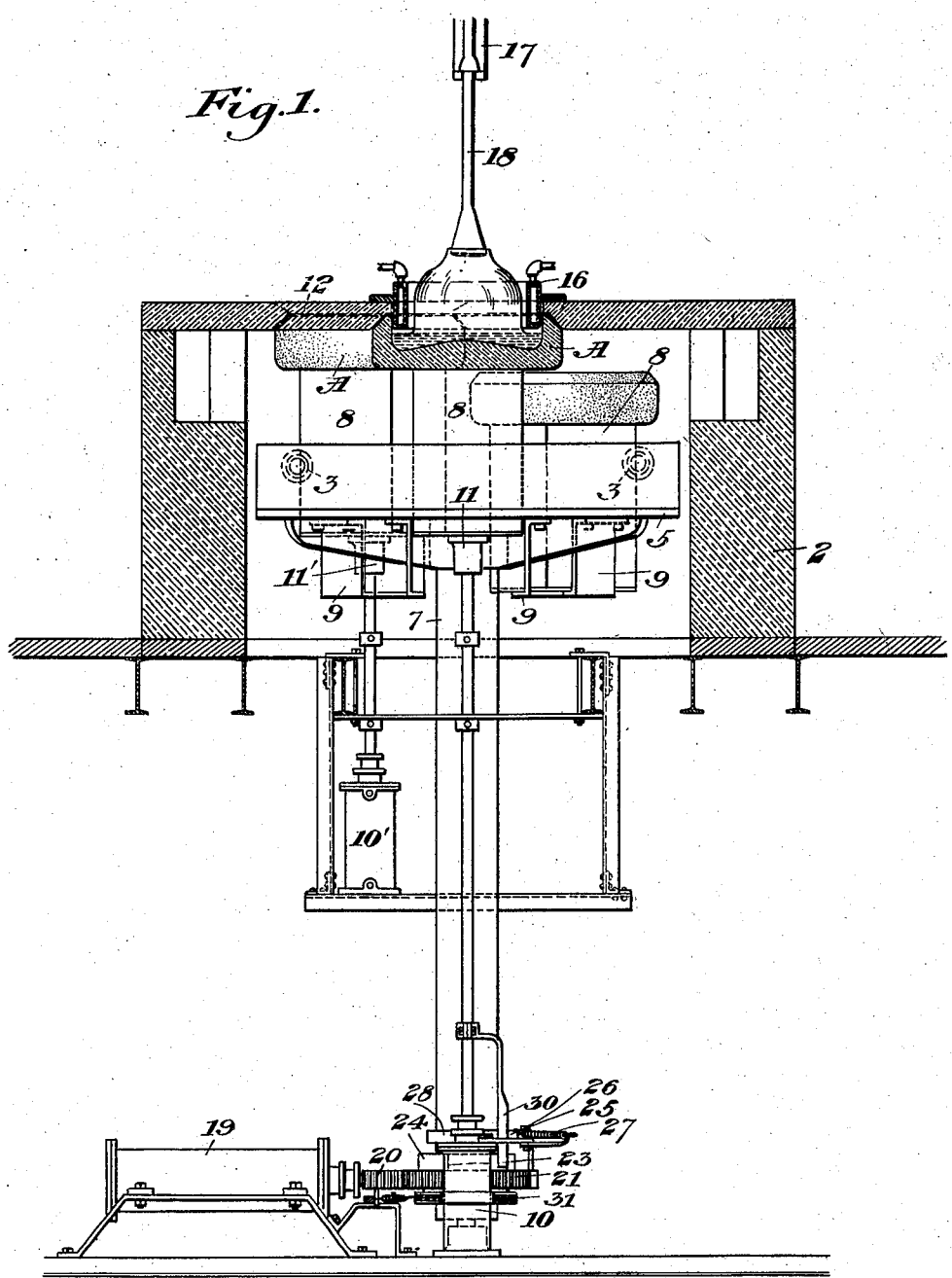
Figure 2:
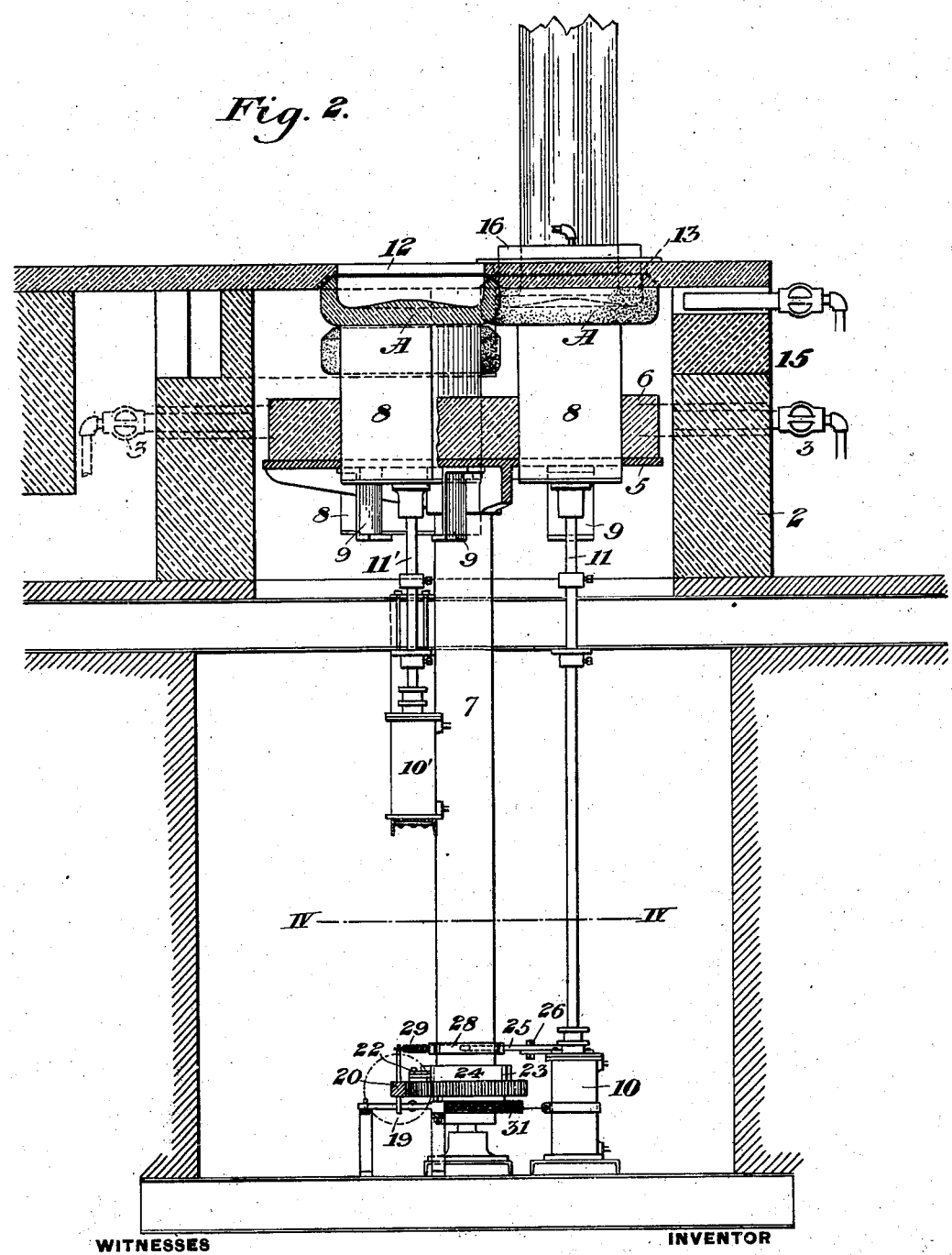
Figure 3:
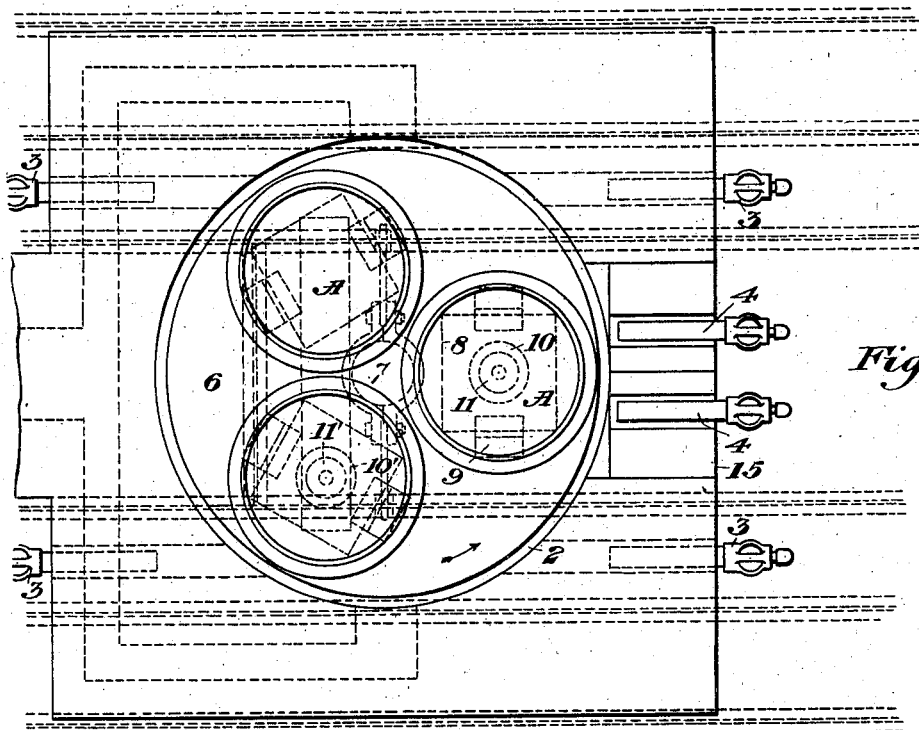
Figure 4:
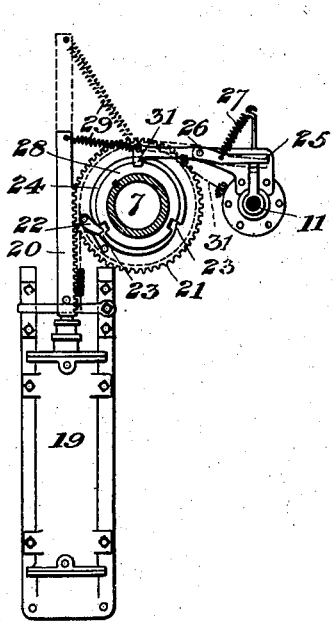
Figure 5:
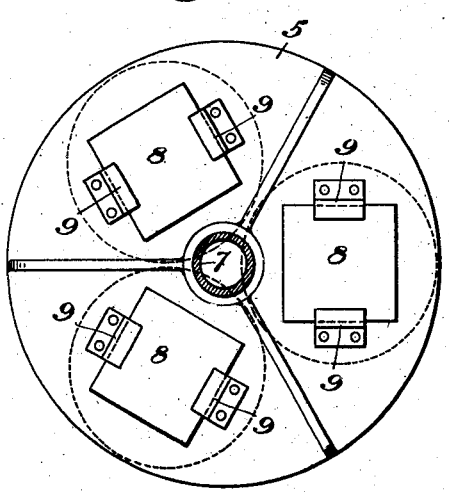
Figure 6:
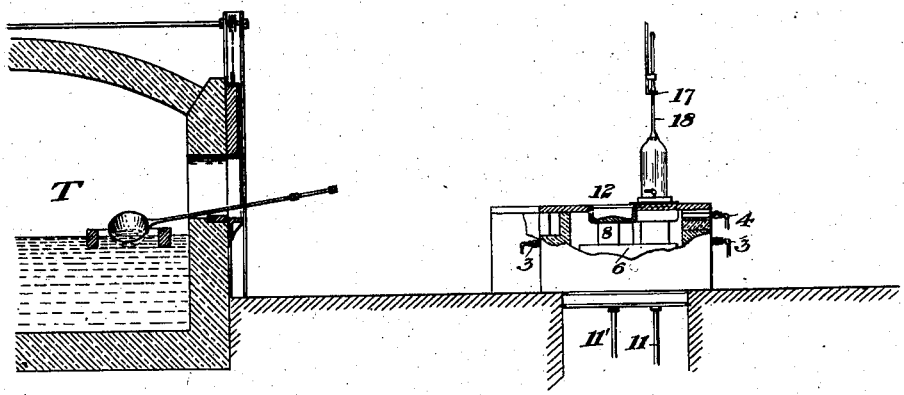

Figure 1 is a front elevation of my improved apparatus, partly in vertical section. Fig. 2 is a side elevation thereof, partly in vertical section. Fig. 3 is a top plan view of the furnace with the tile covers removed. Fig. 4 is a horizontal section on the line IV IV of Fig. 2. Fig. 5 is an inverted plan view of the rotary carrier for the pots. Fig. 6 is a sectional view illustrating the operation of ladling the glass from a tank-furnace preparatory to pouring it into the drawing-pot.

I have discovered that improved results can be obtained in drawing glass articles, such as window-glass cylinders or other hollow glass articles, by delivering the molten glass in measured quantities to heated pots or receptacles adapted to contain substantially enough glass only for drawing a single article and recharging the pot or receptacle preparatory to drawing another article. In this way I am enabled to secure great uniformity in the product, for there is no danger of the drawing of one article spoiling the glass used in the drawing of the succeeding article, and it is easy to regulate the temperature of the glass to suit the conditions required. I have also devised a new method of drawing which is capable of general application whether used with the above discovery or not and for either hollow or other glass articles.

In the drawings, in which I show a preferred form of apparatus for carrying out my method, 2 represents a heating-chamber, which may be of cylindrical form and is preferably heated by gas-burners 3, an upper series of burners 4 being used for separating the drawn article from the pot when the drawing is finished.

The furnace contains a rotary carrier 5, comprising a movable (preferably rotary) turntable, with a refractory covering 6, mounted on a rotary post 7 and carrying a series of blocks or supports 8 8, on which the pots or glass-receptacles A A are set. I show three of these pots; but a greater number may be used, and within the scope of my broader claims it is possible to use one pot, though it is better to provide two or more. When in their lower position, the supports 8 rest on brackets 9. They are adapted to be raised at two positions of the pots by means of lifting-cylinders 10 10′, stationarily mounted beneath the furnace and having plungers 11 11′, extending upwardly beneath the rotary carrier and adapted to elevate the pots to the top of the furnace, so as to register with openings 12 13, which are respectively the charging and the drawing openings and which when the pots are not raised are closed by tile covers. The pots are inserted into the heating-chamber upon the supports 8 through a lateral opening 15, which after the pots have been set may be closed by a tile or block.

The opening 13 in the top of furnace is the drawing-opening at which the glass cylinders are drawn from the pots and is surrounded by a water-cooled ring 16, through which a constant stream of water is maintained. Above it is mounted the drawing apparatus, consisting of lifting mechanism 17 and a pipe 18, which may be like the ordinary glass-blower's pipe and is connected with a source of air from which air under pressure can be delivered through the pipe to the hollow article which is to be drawn, or the arrangements for supplying air may be modified in the manner described in my Patent No. 702,017. The furnace-opening 12 is the charging-opening, and as the pots are successively brought thereto and are raised measured charges of molten glass ladled from a tank T, as shown in Fig. 6, are poured thereinto.

The pots are preferably of substantially the form shown in cross-section in Figs. 1 and 2, having a depressed annular portion at or near the margin, from which the periphery of the hollow article is drawn, so that as the level of the glass sinks in the pot the peripheral portion will be the last to be exhausted, and the supply of glass is thus maintained until the article is completely formed. A part of the annular deeper portion of the pot extends somewhat beyond the margin of the article, so that the small residue of glass at the end of the operation being on the outside will not contaminate or spoil the next charge of glass delivered to the pot. Necessity for skimming of the glass is thus avoided.

The operation is as follows: The pots having been inserted in the heating-chamber and set on the supports 8 in the carrier 5, the pot below the charging-opening 12 is raised, and a measured quantity of glass is poured into it from the ladle. The pot is then lowered and the table rotated, and each pot is charged in the same manner with its quota of glass. When it is desired to draw the glass cylinder, the pot under the drawing-opening 13 is raised into register with that opening by the cylinder 10. The pipe 18 is then lowered into the glass, and its lower end portion forms a bait which surrounds the central air-opening of the pipe. The pipe is then raised gradually and air is simultaneously admitted into it, the air-pressure being first restricted to form the neck portion, as shown in Fig. 1, and then increased to expand the cylinder to the diameter desired, the pressure subsequently being regulated in the manner described in my prior patents.

When the cylinder is completed and the molten glass substantially exhausted from the pot, the pot is lowered, and flame is caused to pass from the burners 4, which, striking the lower end of the cylinder, softens it and makes it easy to separate from the pot. The drawn article is then removed and the table rotated through one-third of its circumference, so as to bring the emptied pot under the charging-opening 12 and a charged pot to the drawing-opening 13. Then by operation of the cylinders 10 and 10' these pots are raised, another article is drawn from the pot under the opening 13, and a charge of glass is ladled into the pot under the opening 12. By reason of the extension of the cavity of the pot beyond the diameter of the glass cylinder the residue of glass which was in the emptied pot will not form blisters or cords to spoil the glass for the next succeeding article. The second article having been drawn, the pots are lowered, the table again rotated, and the operation above described repeated. As the pot travels through the chamber the heat maintains the pot and the glass at the uniform temperature required to obtain the best results.

By having the pots during the operation of ladling the charge of glass substantially at the level of the pouring vessel I avoid the pouring of the glass into the pot from an elevation which would be apt to form in the glass bubbles or blisters, which would disfigure the drawn article and might be a matter of serious consequence. By raising the pot into the drawing position I withdraw its surface from the interior of the heating-chamber, and thus shield it from the flame, at the same time retaining the pot exposed to heat on its bottom, so that chilling of the bottom of the molten glass is prevented. The mechanism by which these effects are produced may be varied in form and construction by the skilled mechanic in many ways, since by illustrating what I believe to be the preferred construction I do not wish to exclude other equivalent mechanism. Thus the vertical motion or lifting of the pots which I deem desirable may be substituted by motion in other directions, and instead of moving the pot-carrier it is possible to move the drawing device into line with the pots successively.

The mechanism which I prefer to use for rotating the pot-carrier is shown in Figs. 1, 2, and 4 and is as follows: An air-cylinder 19 is secured to a suitable base beneath the heating-chamber and is provided with a piston and a rack-bar 20. The teeth of the rack-bar are adapted to engage a toothed wheel 21, loosely mounted upon the post 7. The wheel 21 is provided with a spring-pressed pawl 22, adapted to engage notches 23 in the periphery of a ratchet-wheel or collar 24, which is keyed to the post 7. As the rack-bar is moved outwardly the toothed wheel 21 turns idly upon the post 7. Upon the backward movement of the rack-bar the pawl 22 engages the notches 23 in the ratchet-wheel 24, thereby turning the post and the turn-table supported thereon through one hundred and twenty degrees.

In order to control the movement of the turn-table and the pots carried thereby so as to avoid accidental movement of the parts which might cause the pots to register improperly with the openings or might break the plungers 11 and 11', I provide a safety device, a simple form of which is shown in the drawings and consists of a latch 25, pivoted at 26 to a suitable bracket, which may be attached conveniently to the cylinder 10. A spiral spring 27 is attached to the latch 25 at a point between its outer end and the fulcrum 26, and when the parts are in the position shown in Fig. 4 this spring holds the head of the latch 25 in a notch in a collar 28 on the post 7. A coiled spring 29 is secured to the latch at one end and to the rack-bar at the other, and as the rack-bar moves outwardly the tension of the spring 29 overcomes the tension of the spring 27 and holds the latch 25 out of engagement with the notch in the collar 28. If the plungers 11 and 11' are elevated and the rack-bar 20 is accidentally projected, the disengagement of the latch 25 from the notch in the collar 28 is prevented by the interposition of a bar 30, secured to the plunger 11 and so placed that the latch 25 cannot turn upon its fulcrum 26; but the bar 30 is cut away, so that if the plungers 11 and 11' are lowered its free end can move inwardly under the action of the spring 29, and the latch 25 will be disengaged from the notch in the collar 28. As the rack-bar 20 moves inwardly and through the pawl connection with the ratchet-wheel 24 turns the post 7 the momentum of the parts is checked by a suitable band-brake 31, the braking force being applied by the movement of the rack-bar on its inward stroke. Other mechanism suitable for rotating and stopping the carrier at the desired points may be used.

I claim—

1. The method herein described of drawing glass, which consists in introducing into a pot a measured amount of glass proper for making a single article, reheating the glass in the pot, drawing a glass article therefrom, and recharging the pot; substantially as described.

2. The method herein described of drawing glass, which consists in ladling glass from a body of molten glass into a pot, reheating the glass therein, and then drawing a glass article therefrom; substantially as described.

3. The method herein described of drawing glass, which consists in pouring molten glass into a pot while the pot is elevated near the level of the pouring vessel, moving the pot into a heated chamber, heating the glass therein, and then drawing a glass article from the pot; substantially as described.

4. The method of drawing glass, consisting in feeding a quantity of molten glass into a pot, moving the pot into register with the drawing apparatus, drawing an article therefrom, filling another pot with another charge, removing the first pot, and bringing the second pot into register with the drawing apparatus; substantially as described.

5. The method of drawing glass, consisting in moving a set of filled pots successively into registry with a drawing apparatus, and drawing an article from a filled pot while an empty pot is being charged and another empty pot is being reheated after an article has been drawn therefrom; substantially as described.

6. The method of drawing glass, consisting in moving a series of pots through a furnace-chamber, elevating and charging the pots at one station, and drawing an article from them at another station; substantially as described.

7. The method of drawing glass articles, consisting in feeding quantities of glass to a series of pots in succession, bringing said pots and the drawing apparatus successively into alinement, and drawing glass articles successively from said pots; substantially as described.

In testimony whereof I have hereunto set my hand September 2, 1902.

JOHN H. LUBBERS.

Witnesses:
 THOMAS W. BAKEWELL,
 GEO. B. BLEMING.